United States Patent [19]
Buhl et al.

[11] Patent Number: 5,469,757
[45] Date of Patent: Nov. 28, 1995

[54] APPARATUS FOR THE LIMITATION OF THE WIPING ANGLE OF A WINDSCREEN WIPER UNIT

[75] Inventors: Harro Buhl, Kirchheim; Hans-Peter Rienhardt, Neckarsulm, both of Germany

[73] Assignee: Alfred Teves GmbH, Germany

[21] Appl. No.: 108,592

[22] PCT Filed: Dec. 5, 1992

[86] PCT No.: PCT/EP92/02818

§ 371 Date: Aug. 27, 1994

§ 102(e) Date: Aug. 27, 1994

[87] PCT Pub. No.: WO93/12958

PCT Pub. Date: Jul. 8, 1993

[30] Foreign Application Priority Data

Dec. 28, 1991 [DE] Germany .......................... 41 43 159.6

[51] Int. Cl.⁶ .............................. B60S 1/16; F16H 57/00; F16F 1/04
[52] U.S. Cl. ............................................. 74/526; 74/411.5
[58] Field of Search .................................... 74/526, 411.5, 74/435, 32, 70, 10.2; 192/149, 138, 139; 15/250.13, 250.001

[56] References Cited

U.S. PATENT DOCUMENTS

| | | | |
|---|---|---|---|
| 3,326,054 | 6/1967 | Canick et al. | 74/526 X |
| 3,543,602 | 12/1970 | Riedle | 73/526 |
| 3,768,325 | 10/1973 | Kucharski | 74/435 X |
| 4,094,281 | 6/1978 | Kittler | 74/526 X |
| 4,633,728 | 1/1987 | May | 74/526 X |

FOREIGN PATENT DOCUMENTS

| | | |
|---|---|---|
| 2580567 | 10/1986 | France . |
| 3740312 | 6/1989 | Germany . |
| WO9100203 | 1/1991 | WIPO . |

*Primary Examiner*—Rodney H. Bonck
*Attorney, Agent, or Firm*—Dykema Gossett

[57] ABSTRACT

In a windshield wiper drive for a vehicle, the wiper spindle performs a rotational movement to-and-fro. In order that the inversion of motion does not take place all of a sudden but in a cushioned manner, a part-pinion with a pinion gap is realized when one tooth of the part-pinion is engaged by a cushioning stop member of a spring element. Reciprocally, another tooth strikes against an associated stop member shortly after the inversion of motion. The spring element is elastically deflected in the final phase of the rotational movement and thereby cushions the part-pinion. The spring element is preferably fastened to the gearing cover.

11 Claims, 6 Drawing Sheets

APPARATUS FOR THE LIMITATION OF THE WIPING ANGLE OF A WINDSCREEN WIPER UNIT

BACKGROUND OF THE INVENTION

I. Field of the Invention

The invention is related to an apparatus for limiting the wiping angle of a windshield wiper unit.

II. Prior Art

A wiper unit for an automobile has a wiper spindle drivable to move to-and-fro and bearing a part-pinion of a gearing. The part-pinion is unrotatingly secured on the wiper spindle, so that any driving of the part-pinion always causes the wiper spindle to rotate in the same sense of rotation as the part-pinion. In modem automotive vehicles the wiping angle is in the order of 180 degrees, because the wiper spindle inverts its sense of rotation each time after rotating through approximately 180 degrees or after rotating through any other selected wiping angle. The part-pinion is driven in the prior art manner by another part-pinion of a gearing which is drivingly coupled in prior art manner to an electric miniature motor. With the aid of a state-of-the-art crank mechanism, the inversion of the wiper spindle is brought about any time after having performed a rotational motion corresponding to the wiping angle. The inversion should, however, take place as smoothly as possible, that is to say, without any remarkable jerk, because this does not only lead to annoying noises but in the long run also to detrimental influences on the driving mechanism as a whole.

SUMMARY OF THE INVENTION

It is, therefore, the object of the invention to develop the apparatus of the kind mentioned in such a manner that a cushioned inversion of motion is achieved in either direction of movement of the wiper spindle.

To attain this object, an apparatus according to the invention is configured as an apparatus for limiting the wiper angle of a windshield wiper unit: for an automobile. A spring element of this apparatus is fixed to a housing, preferably to the cover of the gearing and is thus retained unrotatingly and unslidingly. An angled-off free end of a springy arm of the spring element borders each side of a gap between two teeth of a part-pinion which defines a toothless section. A springy arm involved at a particular moment :is elastically deflected when a first or last tooth of the part-pinion comes to strike against the angled-off free end of the respective springy arm. The spring element is associated with the pinion gap in such a way that the striking of the tooth against the angled-off free end or stop member of the springy arm takes place shortly before an inversion of motion. Since an increasing bend of the springy arm brings about an increased rotational resistance, the final phase of the rotational movement of the part-pinion and wiper spindle will progressively be braked in both end directions of the movement to-and-fro. The spring resistance must be selected depending on the motor rating and on the other characteristics of the drive as a whole. Such resistance might be determined by tests. A Jerky inversion of motion with such adverse effects as, for example, the generation of noise, will be avoided with this apparatus. It will be appreciated from the above that when the wiper spindle is in a middle position, the gap of the part-pinion, too, will assume a middle position. In respect to the latter, the pair of stop members are positioned symmetrically.

As a further feature of this embodiment of the invention, it is envisaged that the spring element is substantially configurated in the shape of a bracket having a U-shape, the back of the bracket or U being retained at the cover of the gearing and each free bracket stem or leg of the U being angled off at its end range to form a stop member for a tooth of the part-pinion. The angling-off is preferably realized at a right angle to the plane of the spring element. The latter This structure will allow the spring element to be manufactured in a particularly simple and cheap maimer. Either spring steel wire or a spring steel sheet will do as a starting material. On account of the U or bracket shape, two springy arms, which are two stop members, will be brought about. As a consequence, a symmetrical configuration of the spring element will be attained in an easy manner.

A further feature of this embodiment of the invention is characterized in that, in the retained range of the bracket back, the two bracket legs extend roughly parallel to each other, have a slight lateral distance and are inserted into a baglike receptacle, and in that outside the receptacle, the bracket legs each have a roughly semicircular configuration. The bag is advantageously positioned at the gearing cover or, if a fixation to the gearing housing is envisaged, at the gearing housing. The spring element is dimensioned such that the bracket back may be inserted with ease but that, on the other hand, it is retained already without rattling once it is inserted. If necessary, additional provisions can be taken to secure the said spring element within the baglike receptacle. Put together, the two semicircular sections of the bracket legs form an approximately full circle which is, however, not totally closed. Rather, the two stop members have a lateral distance between them which roughly corresponds to that of the retained partial sections of the bracket legs, the partial sections preferably extending parallel to each other, as do the stop members.

A further feature of this embodiment of the invention affords, in a simple manner, an advantageous formation of the baglike receptacle and also safely secures the spring elements against shifting and twisting.

It is envisaged according to another embodiment of the invention that, in the retained range, the two bracket legs extend roughly parallel to each-other and are shaped hooklike, as well as bent over against each other in the free range. In this instance, the retained range is considerably wider than in the embodiment mentioned above. However, the size of the lateral distance of each of the two stop members is preferably approximately equal. With respect to one and the same wiper drive or to at least similar types of drives, it depends on the specific space conditions which one of these two variants is preferred. On the other hand, the behavior of springiness is not perfectly identical, so that this parameter may also constitute a criterion of selection.

As a further feature of the invention, it is proposed that the back stem of the bracket and the Juxtaposed ranges of the two bracket legs are fixed to a hold-down clamp which is secured to the gearing cover hold-down clamp has one hook-shaped attachment clasping the back stem and each bracket leg. The hold-down clamp can easily be fabricated by combined cutting and bending and easily attached to the gearing cover which is also often manufactured from steel sheet or plate. As far as this is concerned, a riveting operation may be used to attached the hold-down clamp to the gearing cover. The riveting operation need not necessarily be carried out with the aid of loose rivets, the matter may rather be, as an alternative, about riveting elements molded to the component. Spot welds are equivalent if and when this is allowed by the material selected.

In another preferred embodiment of the invention, in contrast to the spring elements described above, no spring steel wire is utilized in this instance; instead a spring steel sheet from which the spring element is punched out and then the stop members formed by bending over provides the structure for the spring element. This spring element, too, is configurated symmetrically with respect the longitudinal center line and is, indeed, assembled symmetrically with respect to the pinion gap, which is referred to as the middle position of the part-pinion.

A further embodiment of the invention is comparable to the Just described embodiment. However with this further embodiment is distinguishable in that the this embodiment is of a "half spring element" in that but one stop member exists in this case. In the presence of the middle position of the part-pinion, this embodiment must be in a middle position with respect to the pinion gap. At the moment of the forward stroke, the one final tooth of the pinion gap strikes against this stop member, as well as does the other final tooth at the moment of the return stroke. This must appropriately be taken account of when stipulating the wiping angle and the pinion gap.

The invention will be described in more detail below, making reference to the accompanying drawings. The drawings show various embodiments of the invention.

DESCRIPTION OF THE PREFERRED EMBODIMENT

Figure 1:
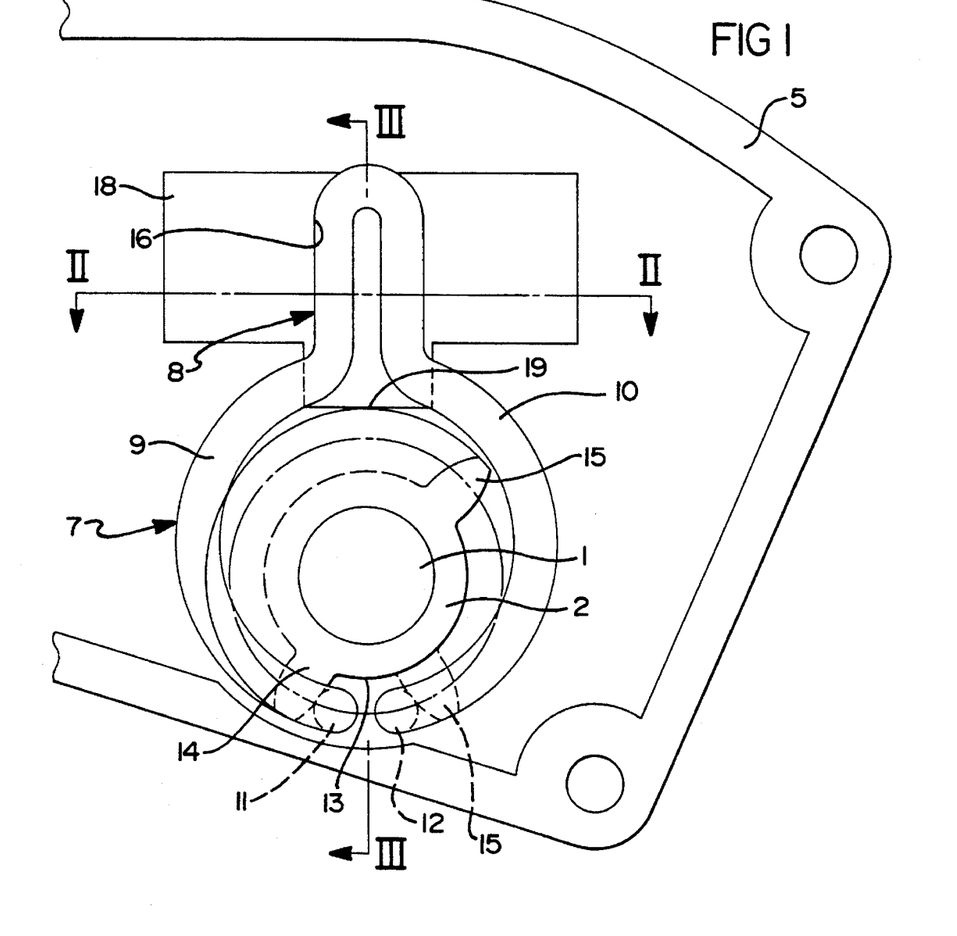
FIG. 1 shows a partial top view onto a first embodiment of the apparatus in the direction of the longitudinal axis of the wiper spindle.
Figure 2:
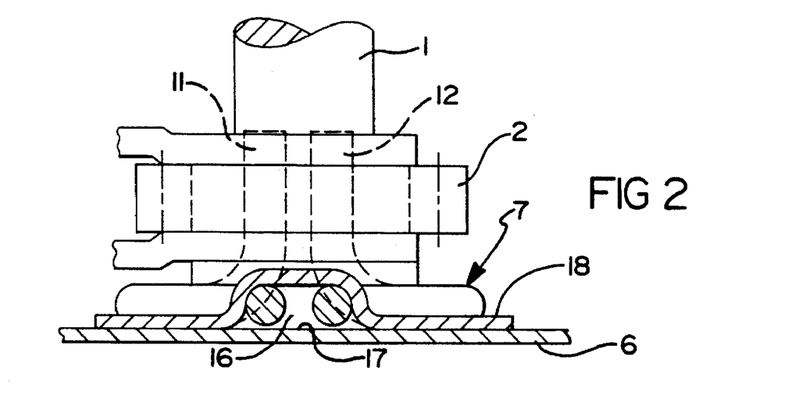
FIG. 2 shows a partial cross section along the line II—II in FIG. 1.
Figure 3:
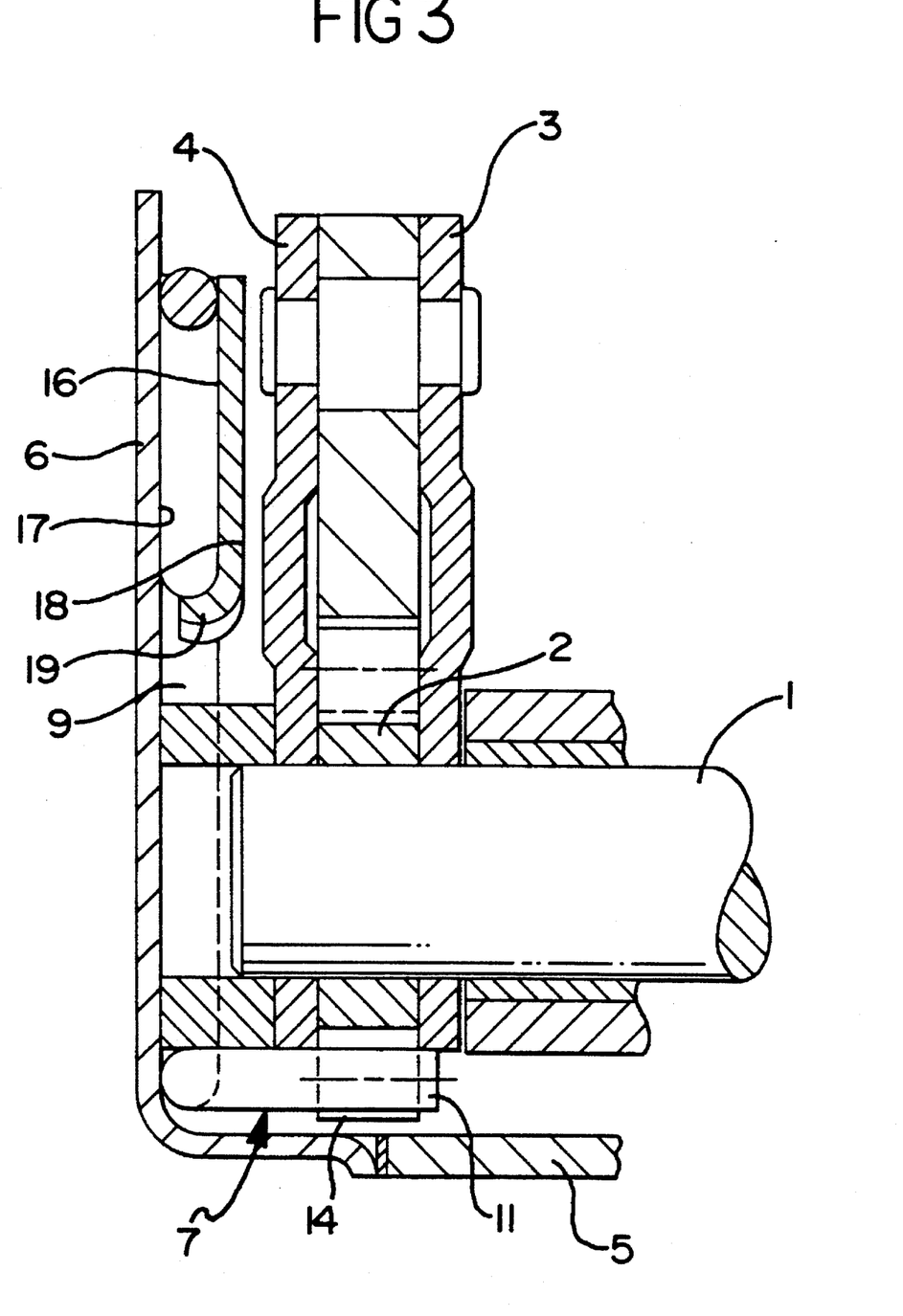
FIG. 3 again shows a partial cross section along the line III—III in FIG. 1.

According to FIGS. 1 to 3, a part-pinion 2 is unrotatingly secured on the wiper spindle 1. Part-pinion 2 is positioned as is known in the art between two side bars 3 and 4 of gearing that is inserted between an electric miniature motor (not shown in the drawing) and the wiper spindle 1. These parts are mounted in gearing housing 5. A spring element 7 is retained within a gearing cover 6. The shape of the spring element 7 is revealed in particular by FIGS. 1 and 3. According to FIG. 1, spring element 7 has a substantially bracket-shaped configuration, the bracket back 8 being retained at the gearing cover 6 unshiftably and unrotatingly so as to be secured against being lifted out. Spring element 7 has two bracket legs 9 and 10 which angle off orthogonally to form two vertical stop members 11, 12, respectively. These stop members 11, 12 engage a pinion gap 13, which is bounded by two final teeth 14 and 15. In FIG. 1 the part-pinion 2 is shown in the one final position in which the tooth 14 is abutted against the stop member 11. The position of the tooth 15 in the other final position of the pinion 2 is illustrated in dashed lines. It will be seen from the drawing that the springy legs 9 and 10 of the spring element 7 are elastically swingable in a plane which is roughly parallel to the plane of the pinion. As a result, the stop members 11 and 12 are moved on an arched course.

In the portion of the spring element that is retained, bracket back 8, the two bracket legs 9 and 10 extend approximately parallel to each other, and according to FIG. 1, bracket legs 9 and 10 have a relatively slight spacing apart. Outside the retained bracket back 8 the bracket legs 9 and 10 have a roughly semicircular configuration. The retained bracket back 8 is inserted into a receptacle 16 of the gearing cover 6. Receptacle 16 is formed by the gearing cover 6 inside surface 17 and by a hold-down clamp fixed to the gearing cover 6. The hold-down clamp 18 has two bracket legs retained at the gearing cover 6, for example, by spot welds. According to FIG. 1 the longitudinal axis of claim 18 extends at right angle to the longitudinal axis of the spring element 7. However, clamp 18 is comprised, in addition, of a laterally projecting hook-shaped central lug 19 with which clamp 18 straddles spring element 7 over the transition of legs 9 and 10 from straight to curved, as can be seen especially clearly from FIG. 3.

Figure 4:
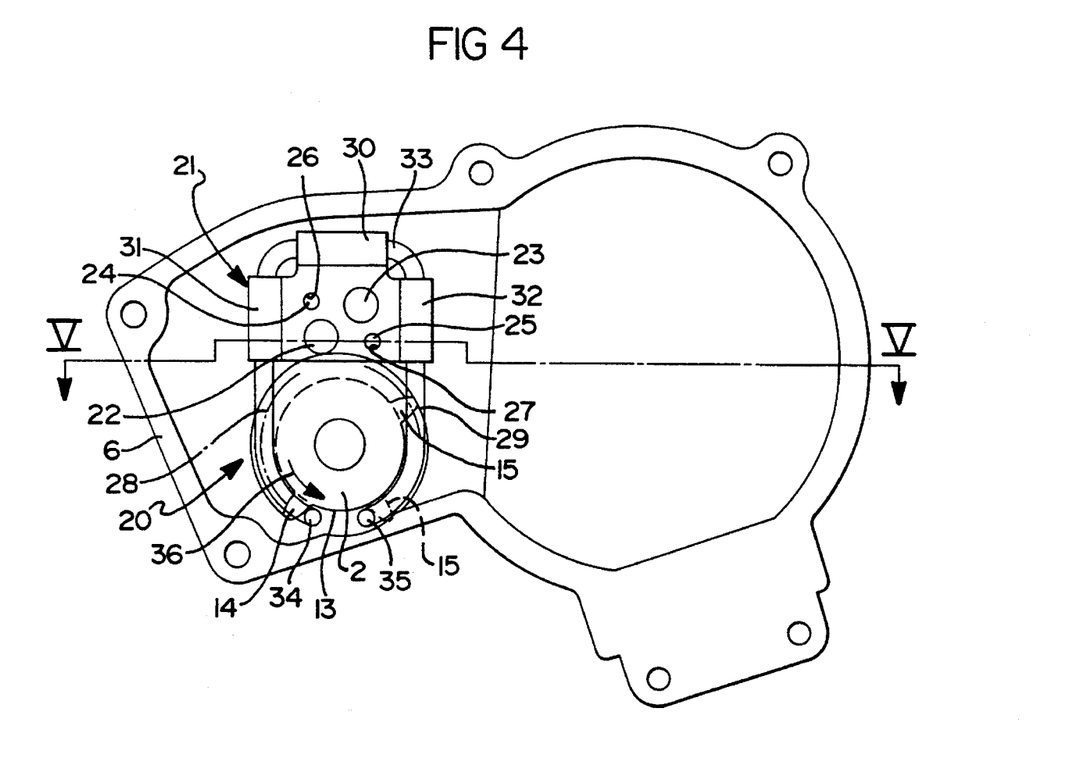
FIG. 4 shows a top view onto the inside of a gearing cover of a second embodiment of the invention.
Figure 5:
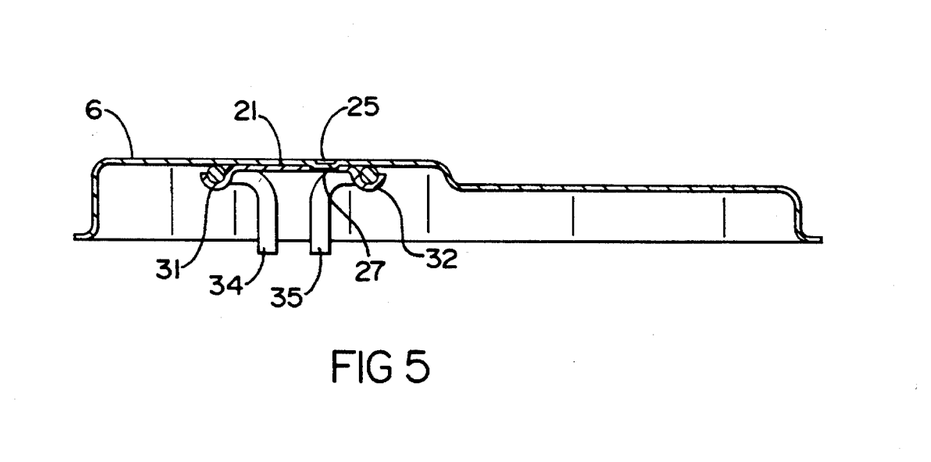
FIG. 5 shows a cross-section along the line V—V in FIG. 4.

In the embodiment of FIGS. 4 and 5 the spring element 20 is again inserted in a cavity of the gearing cover 6 and fixed there with the aid of a hold-down clamp 21. The spring element also has the shape of a bracket which, however, differs from that of the shape of spring element 7 of FIG. 1. The structure comparable to the bracket back 8 is wider, as a consequence whereof the hold-down clamp 21 must be larger. In this instance, too, fastening spring element 20 to the gearing cover is realized with the aid of two welding spots 22 and 23. Two embossed protuberances 24 and 25 are provided at the gearing cover for locating the exact position, with respect to the gearing cover 6, the hold-down clamp 21. Two openings 26 and 27 through the hold-down clamp 21 are associated with the protuberances 24 and 25, respectively.

As in the first described embodiment, two bracket legs 28 and 29 of the spring element 20 extend parallel to each other in the retained range, and in the free range, that is to say, as far as they project beyond the hold-down clamp 21, they have a hooklike configuration. Free hook ends are bent downwardly, in the view shown in FIG. 4. The hold-down clamp 21 has three hook-shaped attachments 30, 31, and 32 which are arranged at right angles to one another. The attachments 31 and 32, which extend parallel to each other, straddle the retained sections of the bracket legs, whereas the hook-shaped attachment 30 holds the back stem 33 of the spring element 20. The spring element is thus, retained at the gearing cover 6 unshiftingly, unrotatingly, and so as to be secured against being lifted out.

The free ends of the bracket legs 28 and 29 are again bent off vertically from the horizontal plane of the spring element to create stop members 34 and 35. Stop members 34 and 35 bound a pinion gap 13, accordingly. FIG. 4 shows two final teeth 14 and 15 of the part-pinion 2, which have a circumferential distance between them that defines the pinion gap 13. The final tooth 14 is shown approximately in the rotational position in which it comes to strike against the associated stop member 34 in the event of a forward, with respect to a return rotation of the wiper spindle 1. The corresponding position of the tooth 15 is shown in dashed lines.

Figure 10:
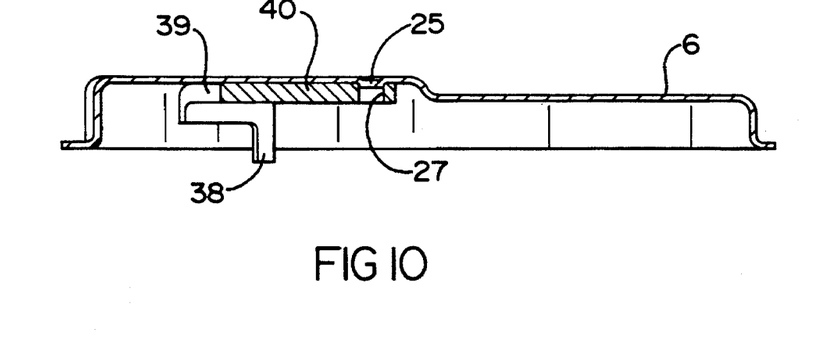
FIG. 10 shows a cross-section alone the line X—X in FIG. 9.
Figure 11:
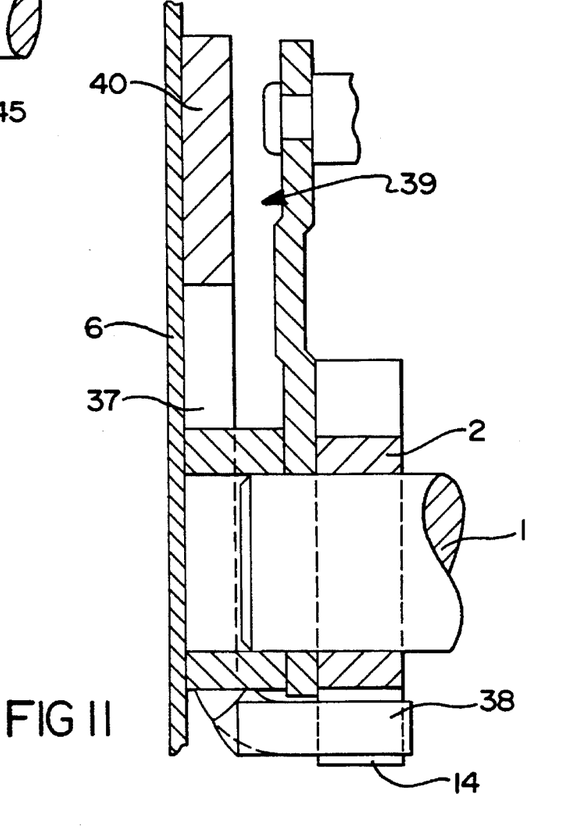
FIG. 11 shows a cross-section along the line XI—XI in FIG. 9.

As to the mode of operation of this apparatus, in the event of a rotational movement of the pinion in the direction of the arrow 36, the final tooth 14 will strike against the stop member 34 shortly before the inversion of motion. During further rotation the bracket leas 28 will springily be bent in the sense of the arrow 36, which will lead to a braking of the rotational movement of the part-pinion and, thus, to a cushioned final phase of the rotational movement. When the wiper spindle 1 rotates in the inverse direction, then again shortly before the inversion of motion, the final tooth 15 will strike against the stop member 35, whereby the bracket leg 29 will then be springily bent in the opposite sense of the arrow 36. A springily cushioned inversion of motion will thus be attained also for this sense of rotation of the part-pinion 2. All other embodiments operate in the same manner, the design illustrated in FIGS. 9 to 11 differing from the other three in so far as one spring leg only exists in these embodiments, so that there is only one stop member 38. However, neither in this instance does the operating principle differ from that of FIGS. 1 to 8.

Figure 9:
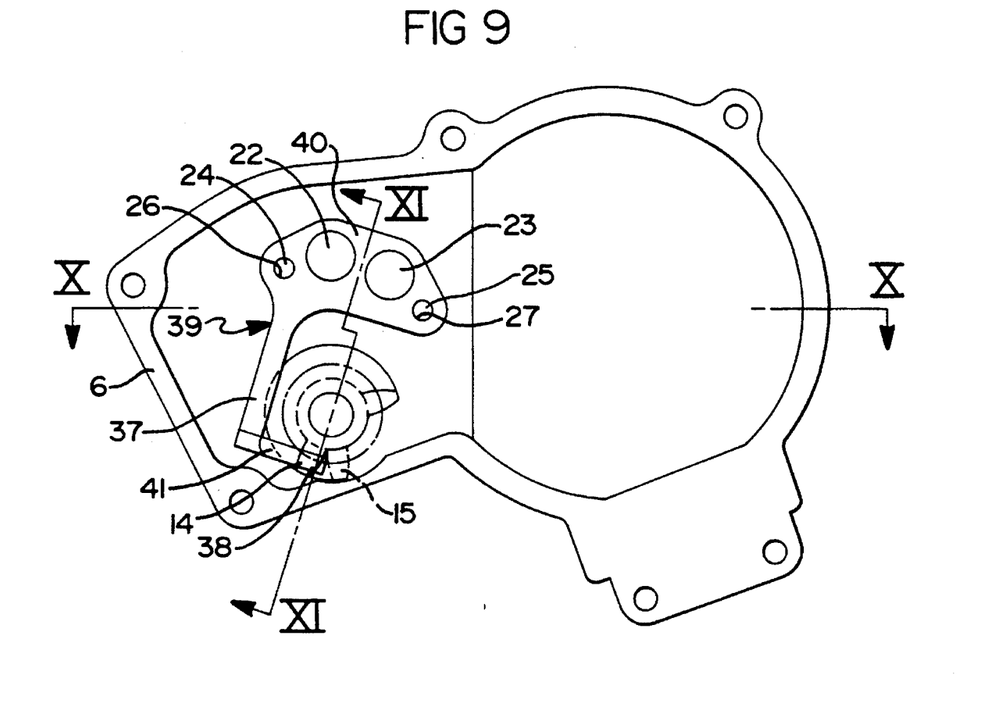
FIG. 9 shows a fourth embodiment of the invention corresponding to the embodiment of FIG. 4.

Accordingly, while the spring elements in FIGS. 1 to 5 are made of spring steel wire, the spring element 39 in FIG. 9 is a stamped part. It is substantially comprised of a fastening plate 40 and of a spring leg 37 which projects from one end portion of fastening plate 40 and angles off twice in contrasting directions, thereby forming a springy arm. As with the prior embodiment shown in FIG. 4, fastening the plate 40 may be realized through two welding spots 22, 23 and the means of locating the plat 40 with respect to the gearing cover 6 by means of two embossed protuberances 24 and 25 and two openings or bores 26 and 27.

Before being bent off into stop member 38, the spring leg 37 has a cranked shape with a first section succeeding the fastening plate 40, a second section 38 at the free end directed parallel to the first section, and a third section 41 extending at right angle to the first and second sections and positioned between these two sections. The third section 41 is bent off at 90 degrees in respect of the first section, as a result whereof the stop member 38 has originated from the second section without bending of the second section in respect of the third section. According to FIG. 9 the third section engages the pinion gap of the part-pinion 2. In FIG. 9, the two final teeth 14 and 15 are each illustrated roughly in the position which they assume in the one final position, in the event of the inversion of motion of the pinion 2. The position of the tooth 15 in the other final position of the pinion 2 is shown in dashed lines.

Figure 6:
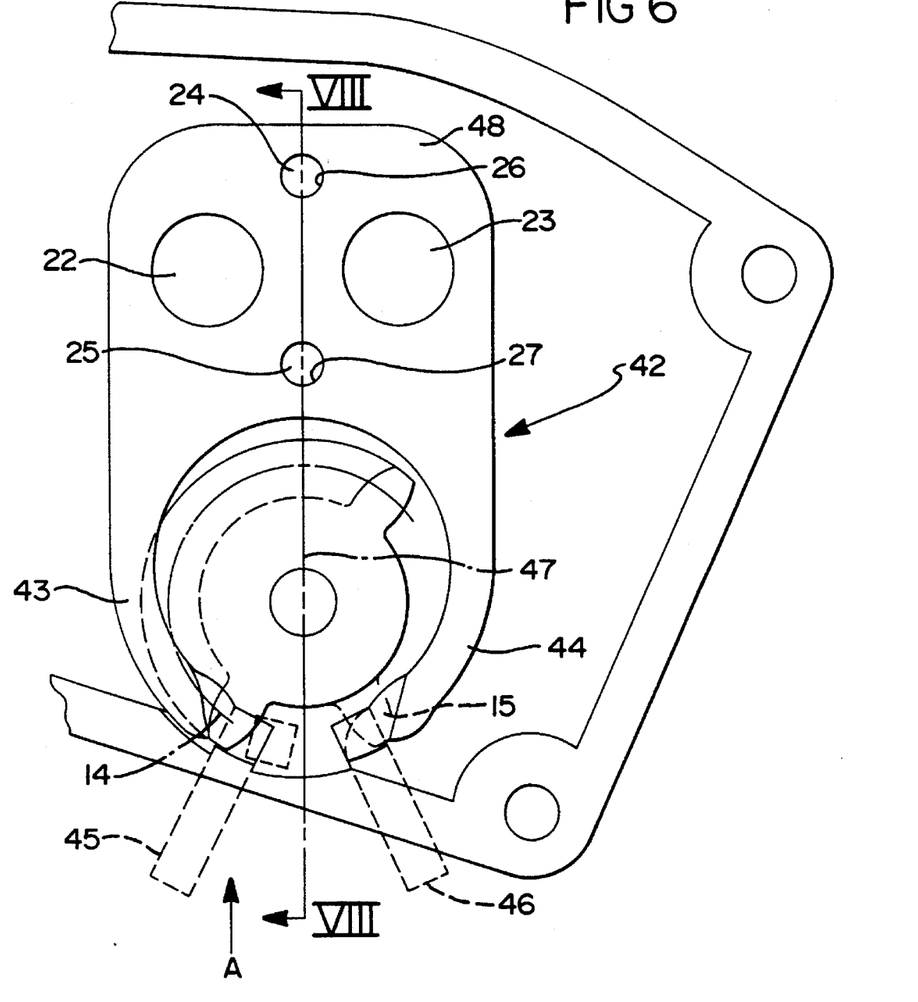
FIG. 6 again shows a top view onto a third embodiment of the invention.
Figure 7:
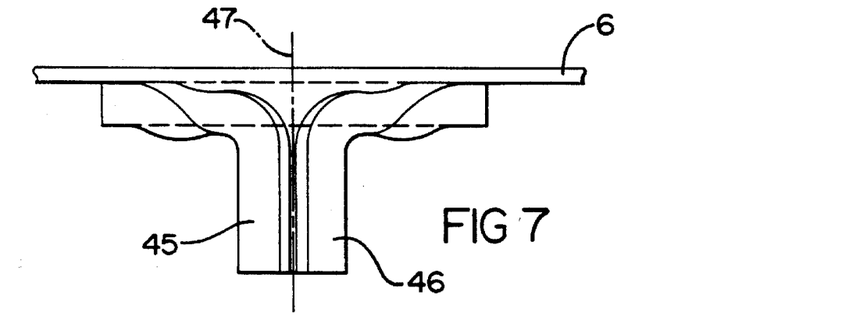
FIG. 7 shows a view in the direction A in FIG. 6.
Figure 8:
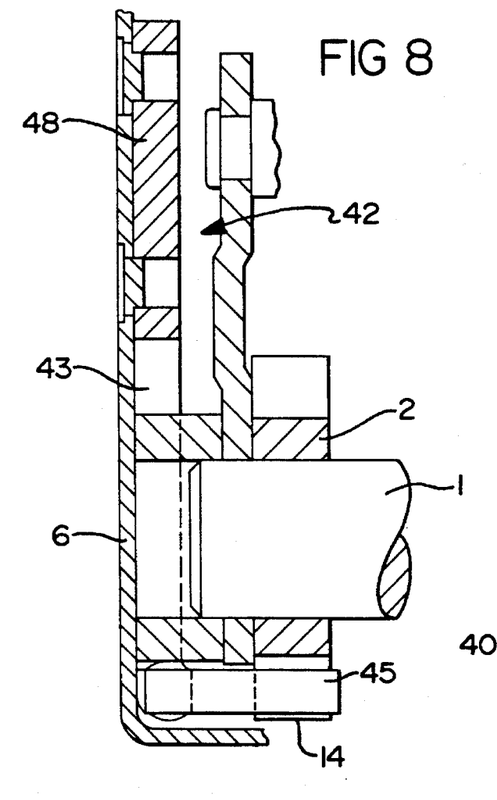
FIG. 8 shows a cross section along the line VIII—VIII in FIG. 6.

The spring element 42 of the embodiment shown in FIGS. 6 to 8 is also a stamped part. In contrast to FIG. 9, it comprises two bracket legs or spring legs 43, 44. Bracket legs 43, 44 are generally S-shaped after stamping-out from the configuration of the dashed lines in FIG. 6. Legs 43, 44 are, however, joggled and bent over at the free end for the formation of stop members 45 and 46, so that in the top view as shown in FIG. 6, legs 43, 44 have the general shape of a C. The stop members, when unloaded, are positioned relatively widely apart. FIG. 7 shows, however, that in the relevant position upon inversion of the pinion, each stop member will reach approximately the longitudinal center line 47 of the spring element 42. In that event, the final teeth 14 and 15 will then one after the other, assume the positions seen in FIG. 6 and marked out in continuous lines for the tooth 14 and in dashed lines for the tooth 15.

The spring element 42 also is furnished with a fastening plate 48 which generally constitutes a wide-shaped bracket back. The fastening to the gearing cover 6 may be realized also in this embodiment by means of two welding spots 22 and 23. For fixation, with respect to the fastening plate 48 once again two embossed protuberances 24 and 25 of the gearing cover 6 may be to which engage recesses or bores 26, 27 of the spring element.

What is claimed is:

1. An apparatus for the limitation of the wiping angle of a windshield wiper unit for a vehicle, the wiper unit having a wiper spindle drivable to move to-and-fro, the apparatus comprising: a part-pinion lying substantially in a plane and having at least two teeth each projecting radially outwardly from said part-pinion; housing means for anchorage; a spring element having at least one springy arm, the spring element being anchored to said housing means, the at least one spring arm being elastically swingable in a plane generally parallel to the pinion plane, said springy arm having a free end projecting at an angle from said pinion plane, the springy arm being reciprocatingly engaged by said teeth to limit travel of said teeth on said part-pinion.

2. An apparatus as claimed in claim 1, wherein said spring element includes a back portion, the back portion being retained, to define a retained range, the rest of the spring element being free, to define a free range.

3. An apparatus as claimed in claim 2, wherein, where the spring element back portion is retained, two bracket legs each extend as straight legs, roughly parallel to each other, and have a slight lateral distance between each other, wherein the apparatus further comprises a receptacle, the bracket legs, where the bracket back is retained, being and inserted into the receptacle, and wherein outside said receptacle said bracket legs are each curved, having a roughly semicircular configuration.

4. An apparatus as claimed in claim 3, wherein the housing means is a gearing cover, the cover having an inside surface, and wherein said receptacle comprises the cover inside surface and a hold-down clamp which is fastened to the cover and which straddles said bracket back transversely to the longitudinal center line of said bracket back and which includes a hook-shaped central lug projecting along said centerline straddles the range of transition from straight to the curved legs.

5. An apparatus as claimed in claim 2, wherein the said two bracket legs extend roughly parallel to each other in the retained range and have a hooklike configuration.

6. An apparatus as claimed in claim 5, wherein the housing means is a gearing cover and wherein the apparatus further comprises a hold-down clamp, the bracket back being secured to said gearing cover by said hold-down clamp which is fastened to said gearing cover, said hold-down clamp having three hook-shaped attachments each capturing said back and each said bracket leg.

7. An apparatus as claimed in claim 6, wherein said cover has two nipple-shaped embossed protuberances and said hold-down clamp has two openings, and wherein the said hold-down clamp is riveted to said gearing cover and is located before riveting by means of the two nipple-shaped embossed protuberances of said cover, each said embossed protuberance engaging an opening of the said hold-down clamp.

8. An apparatus as claimed in claim 1, wherein the said spring element is a stamped part and is substantially comprised of a fastening plate, the spring legs extending symmetrically from said fastening plate, and wherein said at least one springy arm is two generally S-shaped spring legs, said fastening plate being arranged symmetrically each. S-shaped leg being angled off with respect to the plane of said spring element to form a stop member.

9. An apparatus as claimed in claim 1, wherein said spring element is a stamped part and is substantially comprised of a fastening plate and wherein said at least one springy arm is one spring leg projecting from the fastening plate.

10. An apparatus as claimed in claim 8, wherein said cover has two nipple-shaped embossed protuberances and said fastening plate has two openings which are engaged by each of said nipple-shaped embossed protuberances, and wherein said fastening plate is coupled to said cover by two welding spots.

11. An apparatus as claimed in claim 9, wherein said cover has two nipple-shaped protuberances and said fastening plate has two openings which are engaged by each nipple-shaped embossed protuberance, and wherein said fastening plate is coupled to said cover by two welding spots.

* * * * *

UNITED STATES PATENT AND TRADEMARK OFFICE
CERTIFICATE OF CORRECTION

PATENT NO. : 5,469,757
DATED : Nov. 28, 1995
INVENTOR(S) : Harro Bughl, et al.

It is certified that error appears in the above-indentified patent and that said Letters Patent is hereby corrected as shown below:

Column 6, line 20, change "spring" to read --springy--.

Signed and Sealed this

Twenty-fifth Day of March, 1997

Attest:

BRUCE LEHMAN

Attesting Officer

Commissioner of Patents and Trademarks